US007543321B2

(12) United States Patent
Leftwich

(10) Patent No.: US 7,543,321 B2
(45) Date of Patent: Jun. 2, 2009

(54) MULTIPLE DATABASE, USER-CHOICE-COMPILED PROGRAM AND EVENT GUIDE

(75) Inventor: James J Leftwich, Palo Alto, CA (US)

(73) Assignee: StarSight Telecast, Inc., Fremont, CA (US)

( * ) Notice: Subject to any disclaimer, the term of this patent is extended or adjusted under 35 U.S.C. 154(b) by 196 days.

(21) Appl. No.: 10/967,672

(22) Filed: Oct. 15, 2004

(65) Prior Publication Data

US 2005/0138657 A1    Jun. 23, 2005

Related U.S. Application Data

(63) Continuation of application No. 09/060,343, filed on Apr. 14, 1998, now abandoned.

(60) Provisional application No. 60/043,248, filed on Apr. 16, 1997.

(51) Int. Cl.
*G06F 3/00*    (2006.01)
*G06F 13/00*   (2006.01)
*H04N 5/445*   (2006.01)

(52) U.S. Cl. .......................................... 725/44; 725/45
(58) Field of Classification Search .................... 725/39, 725/44, 46, 47, 25, 27, 28, 50, 52
See application file for complete search history.

(56) References Cited

U.S. PATENT DOCUMENTS 4,706,121 A    11/1987   Young
5,311,423 A    5/1994    Clark
5,353,121 A    10/1994   Young et al.
5,465,113 A    11/1995   Gilboy
5,559,548 A    9/1996    Davis et al.
5,589,892 A    12/1996   Knee et al.
5,596,373 A    1/1997    White et al.
5,621,456 A    4/1997    Florin et al.
5,671,411 A    9/1997    Watts et al.
5,694,176 A    12/1997   Bruette et al.
5,912,664 A    6/1999    Eick et al.
5,926,230 A  * 7/1999    Niijima et al. ................ 725/56
6,005,565 A    12/1999   Legall et al.
6,005,631 A    12/1999   Anderson et al.
6,008,803 A    12/1999   Rowe et al.
6,020,880 A    2/2000    Naimpally
6,133,909 A    10/2000   Schein et al.
6,850,693 B2   2/2005    Young et al.

FOREIGN PATENT DOCUMENTS

JP    06-153109    5/1994
JP    07-297796    11/1995
JP    08-289218    11/1996
JP    08-289219    11/1996
JP    09-37168     2/1997
WO    WO 1996/41477 12/1996

OTHER PUBLICATIONS

PCT Search Report of PCT/US98/07567.

* cited by examiner

*Primary Examiner*—Ngoc K Vu
(74) *Attorney, Agent, or Firm*—Ropes & Gray LLP

(57) ABSTRACT

An electronic programming guide generator utilizes filters to select only programming filtered to display in an electronic programming guide display.

21 Claims, 6 Drawing Sheets

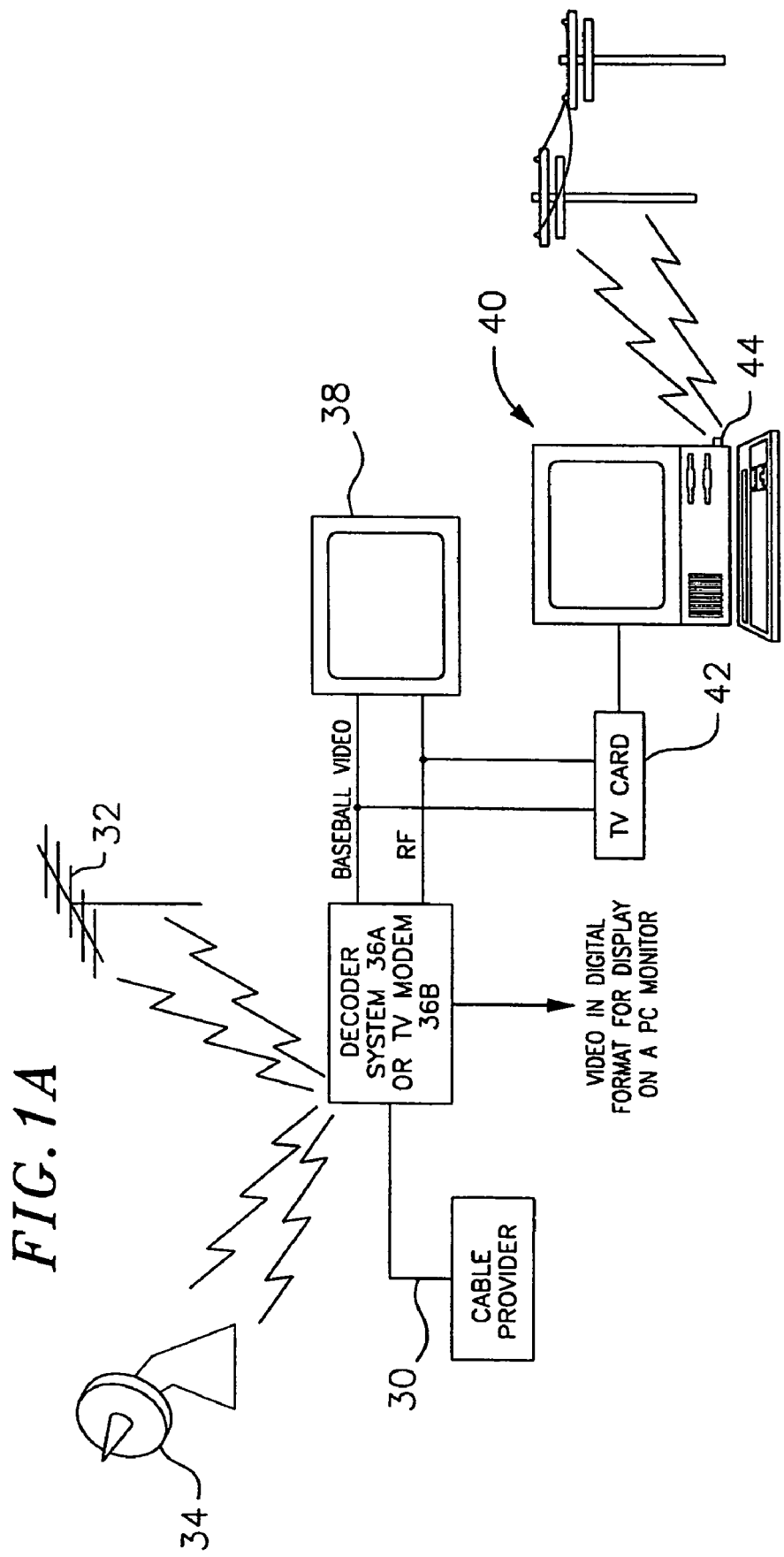

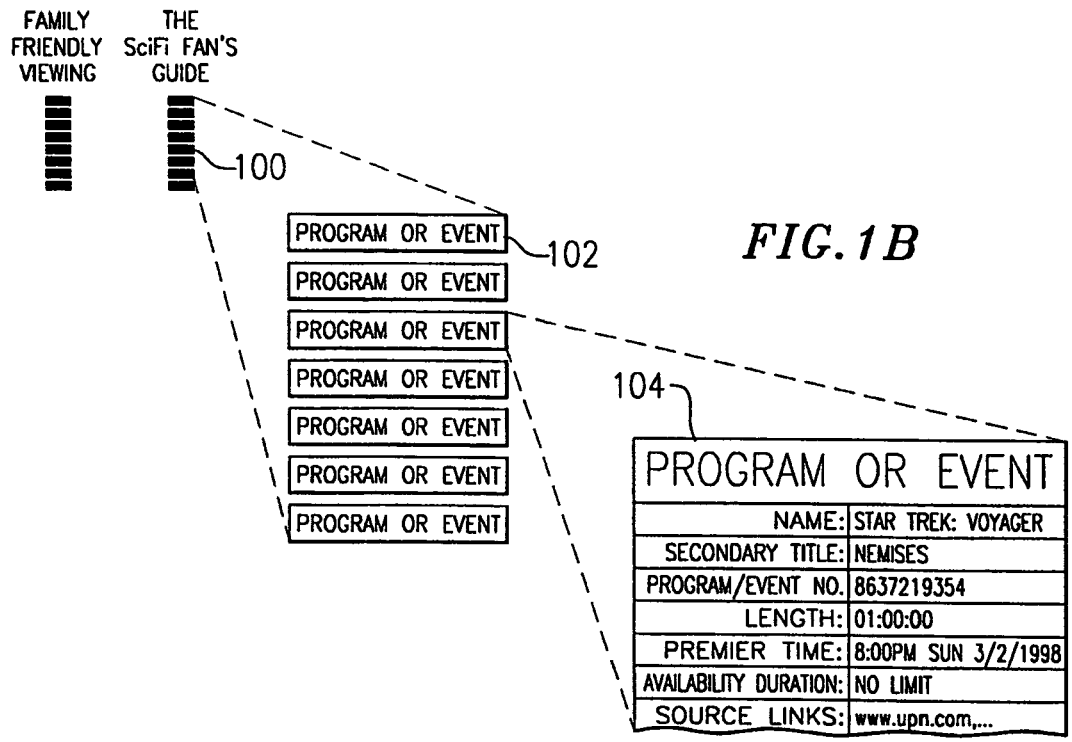
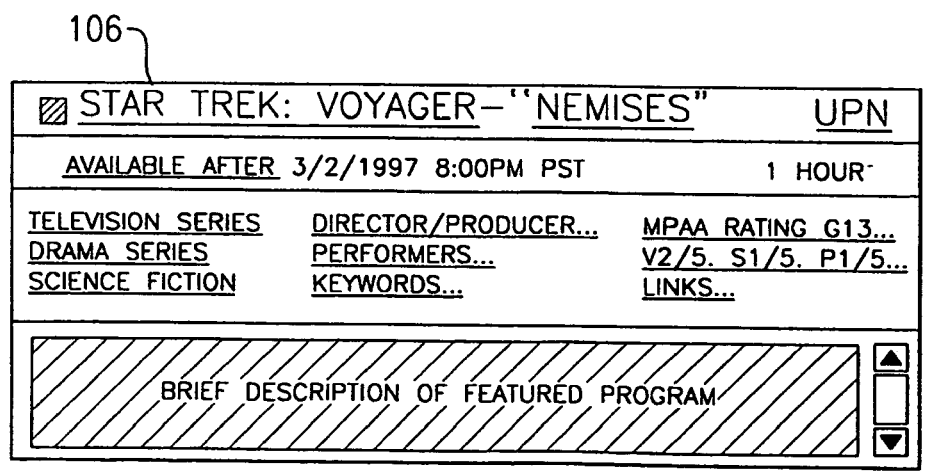
FIG. 1B

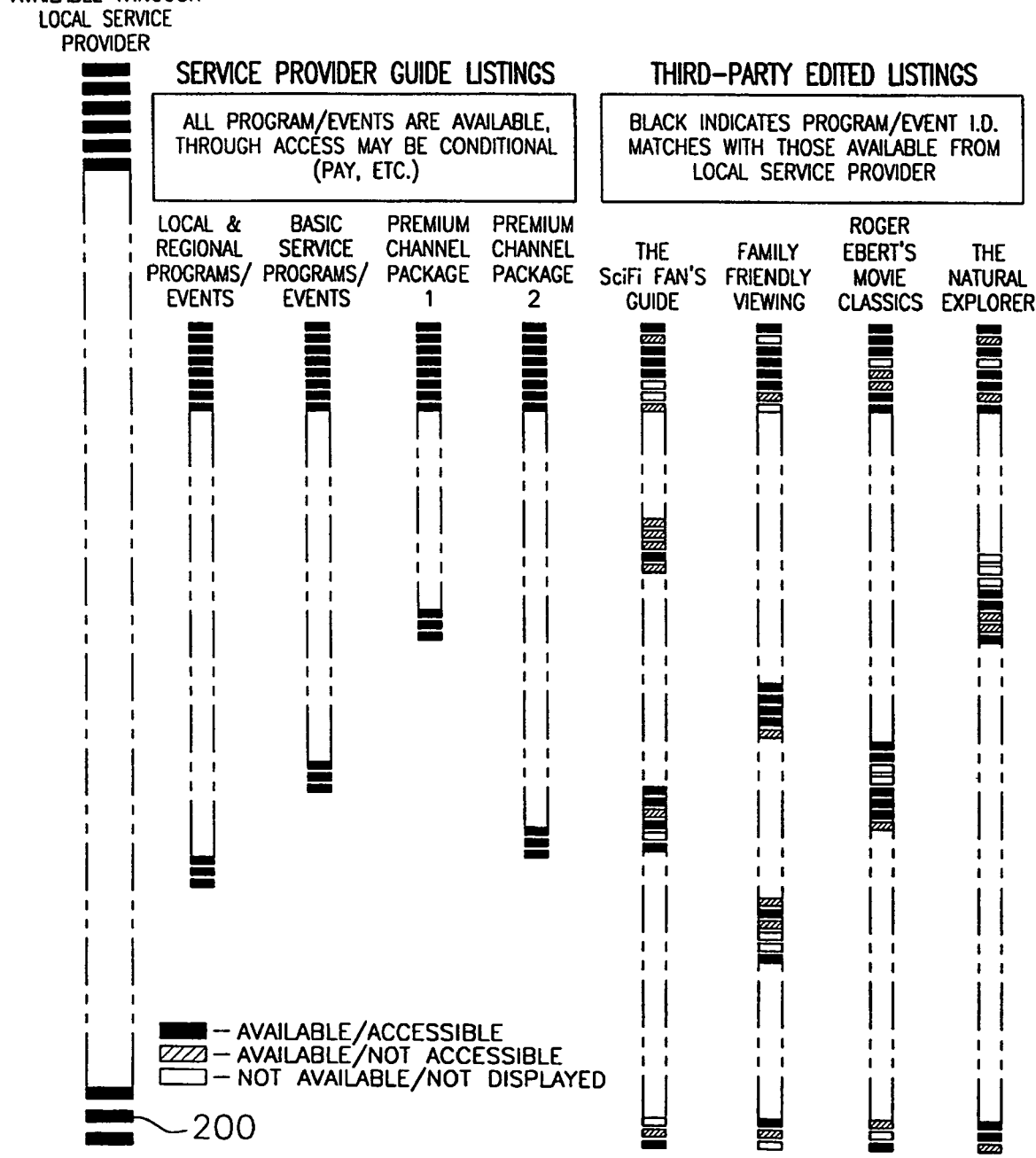

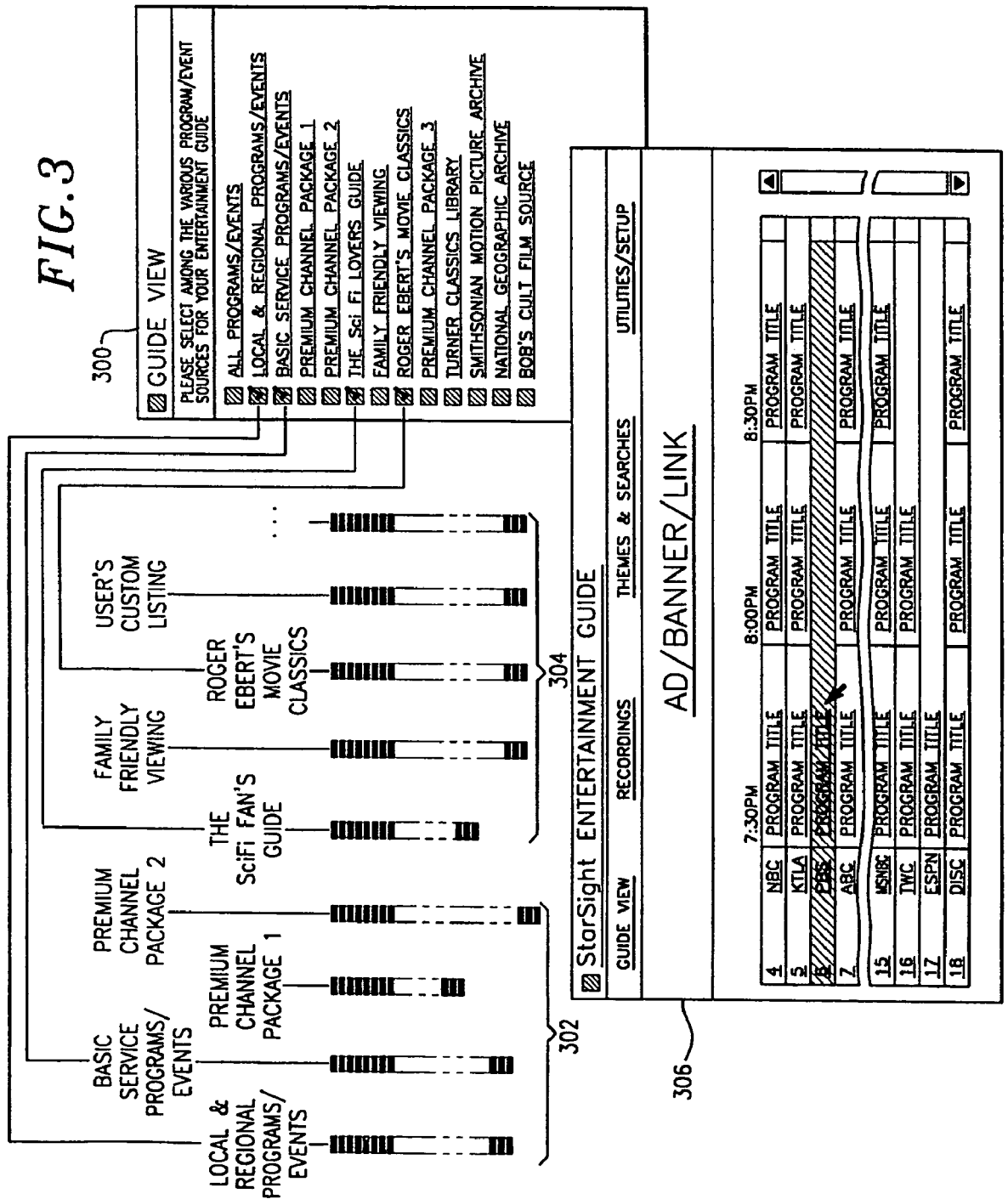

MULTIPLE DATABASE, USER-CHOICE-COMPILED PROGRAM AND EVENT GUIDE

This application is a continuation of U.S. patent application Ser. No. 09/060,343 filed Apr. 14, 1998 now abandoned, which claims the benefit of U.S. Provisional Application No. 60/043,248, filed Apr. 16, 1997.

BACKGROUND OF THE INVENTION

The present invention generally relates to television schedule information, and more particularly to a system and method for providing previews of scheduled programming to assist a viewer in making scheduling decisions.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased.

Additionally, television faces a digital future that will see the merger of television and PC technology. The television set of the future will include a micro-computer, a modem of interconnectivity with other computers over networks, intranets, and the internet, and be connectable to computer peripherals such as printers. Such capabilities as near "video on demand" (NVOD), "video on demand," "access to the world wide web," "audio on demand," etc., will present the viewer with a plethora of information and bandwidth.

As has become increasingly evident, information overload can actually reduce the usefulness of the information delivered. Accordingly, a great challenge exists to provide an interface that manages and provides an intelligent, user-friendly interface to the information available.

Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. Today's guides have only a single source listing, with all available programming presented in a time-based schedule grid. There is also no current ability to allow third parties with different finding/filtering criteria to create useful listings and/or access for viewers.

Also, there is an increasingly important dual need among users to both screen out unwanted programming and find desired programming. As the number of programs/events accessible increases, these issues will become even more important and current strategies such as simple program ratings will not be effective or efficient enough to handle these interrelated user needs.

SUMMARY OF THE INVENTION

The present invention is related to the complementary aspects of Finding Programming and Blocking Programming. The model assumes that certain channels are available to a viewer and other channels are accessible.

According to one aspect of the invention, Editable Filters (EFs) are created based on a standardized program database. These EFs include a basic menu supplied upon startup and optional menus which could be included in the SS database or be downloadable from the WWW. Third party editors will be able to build an EF by utilizing entries which are used to interact with the DB.

According to another concept of the invention, the editable filters are ordered in a hierarchy. Channel select and parental control filters will supersede all other filters. Thus, even if a selected EF allows a program, parental control will override the selection.

According to another aspect of the invention, the viewer will register to use a list.

Other features and advantages will be apparent in view of the detailed description filed herewith and the following claims.

BRIEF DESCRIPTION OF THE DRAWINGS

FIG. 1A is a schematic drawing of a television system;

FIG. 1B is schematic diagram depicting of an implementation of a filter;

FIG. 2A is a schematic diagram depicting source provider guide listings and third-party edited listings;

FIG. 3 is a schematic diagram of a system of selecting filters; and

DETAILED DESCRIPTION OF THE PREFERRED EMBODIMENTS

Figure 2B:
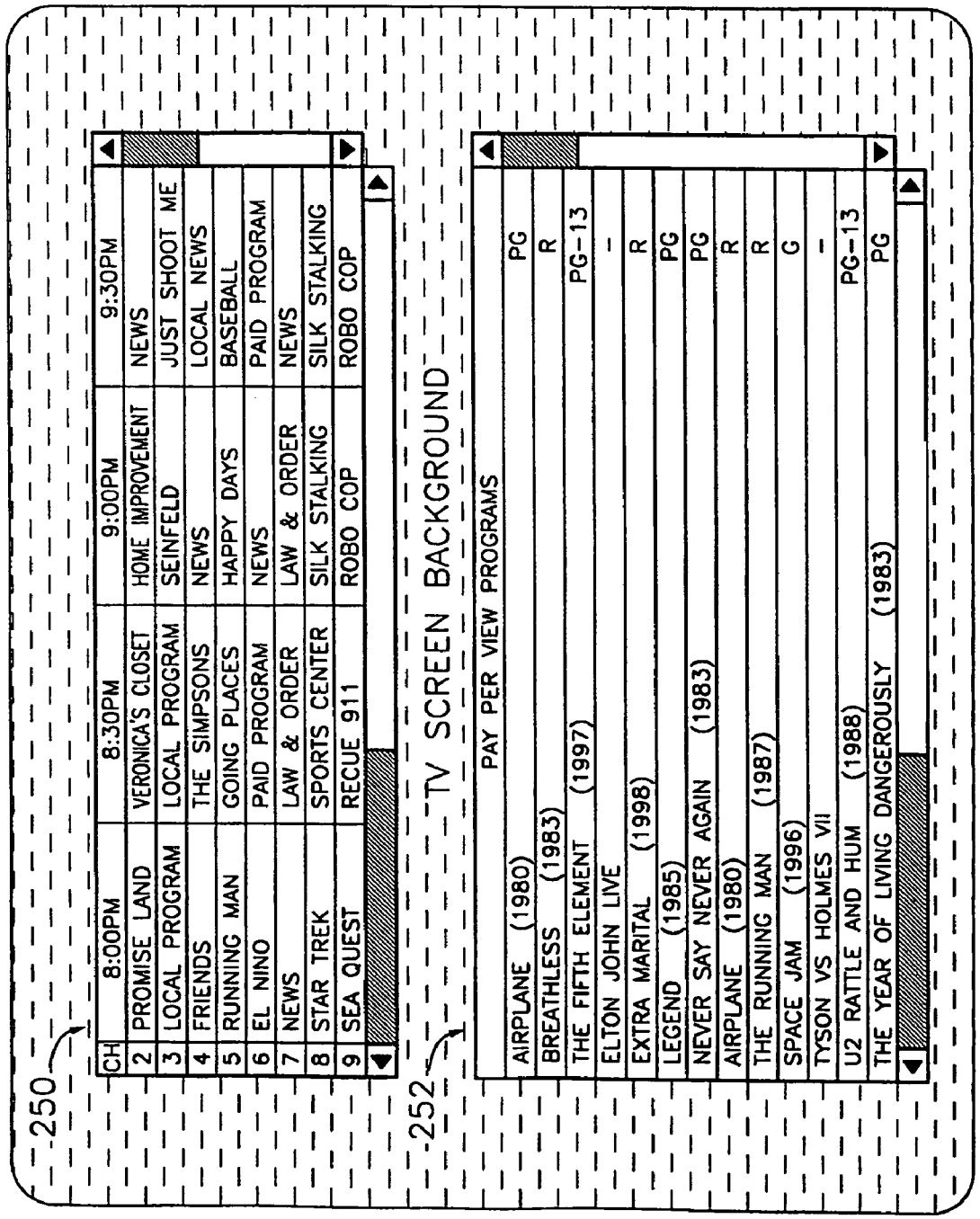
FIG. 2B is a schematic diagram depicting alternative formats of an EPG display.

Electronic programming guides (EPGs) are well-known in the art. One type of programming guide is provided by the assignee of the present invention, StarSight and described in U.S. Pat. No. 5,169,274, is displayed as a grid of program entries with the vertical axis of the grid being the channels or program sources of program entries and the horizontal axis being starting times of programming entries. Other EPGs are provides by satellite services.

An EPG is generated from a data base based on programming provided by a local service provider. Existing EPG services include some program blocking features and also provide for selecting favorite channels and ordering the channels in a preferred manner.

In a preferred embodiment, the electronic program guide of the invention may be implemented either on a personal computer, a PCTV, a television connected to a set-top box, or a television including a custom board. However, the invention is not limited to any particular hardware configuration and will have increased utility as new combinations of computers and television systems are developed. In the following, any of the above will sometimes be referred to as a "TV system." Block diagrams of representative TV systems are depicted in FIG. 1A. Details of implementation are not depicted because the invention is not limited to any particular TV system.

As is well-known, the picture to be displayed may be transmitted as an analog signal, for example according to the NTSC standard utilized in the United States, or as a digital signal modulated onto an analog carrier. The signals may be received over a cable or via an antenna or satellite dish. Typically, television sets are designed to receive analog signals and computer display devices are designed to display pictures encoded in a digital format. However, the decoder system converts the digital data to an analog signal for display on a television set and TV modems can format analog TV signals for display on a monitor.

In FIG. 1A, analog or digital TV signals, received via cable 30, antenna 32, or satellite dish 34, are provided to a television system. If the signal is from a digital broadcast service, then a decoder 36 converts the signal to baseband video and audio or channel 3/4 RF. If the signal is an analog signal it is passed through as a live video output. The television system 38, depending on its configuration, receives selected ones of the outputs and displays the received program.

A PCTV includes a TV card 42, connected to either live video, baseband video, or channel 3/4 output, digitizes the video image and displays the video image in a resizable window on the computer monitor. The PCTV is also coupled to land telephone lines by a modem 44.

If the received signal is an analog TV signal, the TV card of the PCTV digitizes the analog signal and extracts included information from the vertical blanking intervals. On the other hand, if the signal is a digital signal, separate audio, video, VBI (vertical blanking information such as closed caption, teletext, and program related information), program guide, and conditional access information are provided as separate bitstreams. The video and audio bitstreams for programs are converted to a format for display and the program guide information is processed to form a program guide database. The processor, executing software stored in memory, generates interactive electronic program guide images and images of received programs. The guide can be used to interact with and control programs displayed in the window.

In a preferred embodiment of the invention, filters are utilized to select and screen programming displayed by an EPG. In this context a filter is a mechanism for selecting programs based on a selected criterion or criteria.

However, for a filter to be useful in the present context, it is in the form of a list of programs or event entries where the entries must be in a format usable by the EPG generating system.

An example of a useable format for filters is depicted in FIG. 1B. In FIG. 1B, a filter 100 is a list of a program or event entries 102. The filter entitled "The Sci-Fi Fan's Guide" is a list of programs selected according to a criterion or criteria that selects programs of interest to sci-fi fans.

The format for a program or event entry is depicted in the table 104. The information in the table is used by the EPG generating system to generate an EPG display as described below. The table could be formatted in HTML so that the filter entries 102 could be displayed in a user friendly format 106.

In a preferred embodiment both service provider guide listings and third-party edited guide listings are utilized to select programming displayed in the EPG.

Examples of Subscription-based, Filtering Program/Event Services; live or archived e.g.: The Family-Friendly subscription service (delivering a described/understood mix of general audience programs/events, some of which may be custom-selected according to a subscriber's viewing history/preferences.)

e.g.: The Science Source subscription service (delivering a described/understood mix of science-related programs/events, some of which may be custom-selected according to a subscriber's viewing history/preferences.)

e.g.: Bob Smith's Cult Film Access Listing (allowing a Starsight user to incorporate a third party's list into the Guide) (providing access links to a described/understood mix of cult film-related programs/events.)

FIG. 2A illustrates the use of third-party edited guide listings. The entire universe of available programming is indicated by the list of all programs/events provided by the local service provider 200.

As depicted in FIG. 2A, some of the programs listed in the Sci-Fi Fan's Guide are either not available (light gray bar) or available/not accessible (dark gray bar). A program available but not accessible is a premium program not subscribed to by the user.

The EPG generator utilizes the filter to display those programs available/accessible in the EPG. Alternatively, programs available/not accessible might also be displayed as an incentive to the viewer to subscribe to the premium program which meets a selected filter's criterion or criteria. This could be a powerful revenue generator for the service provider.

FIG. 2B depicts alternate ways of formatting an EPG. For programs events which are available only at prescribed times the show listings are displayed in a grid 250. Those programs/events which are randomly accessible, e.g., archives, libraries, file libraries, etc., appear in a list section of the EPG.

In a preferred embodiment, the actual filtering of the programs to be displayed in an EPG is performed utilizing the Program/Event ID in the entry table 104 (FIG. 1B).

In the present embodiment, the EPG generator provides an interactive filter selective mechanism. In FIG. 3, a user configuration screen 300 lists both service provider filters 302 and third-party filters 304. Each time a new filter is added it is registered with the EPG generator and added to the list in the user configuration screen 300. Only those programs filtered by the selected filters will be displayed on the EPG screen 306.

In a preferred embodiment, the filters may be prioritized. For example, in a family with small children the most important criteria might be that a program be included in the Family Friendly Viewing filter. This filter is assigned the highest priority. Then, for example, a program included in the Sci-Fi Fan's filter but not included in the Family Friendly Viewing filter would not be displayed in the guide. Further, the filters could be prioritized by time. Family Friendly Viewing would have the highest priority during the hours when children are viewing and then automatically drop to a later priority during late hours.

Figure 4:
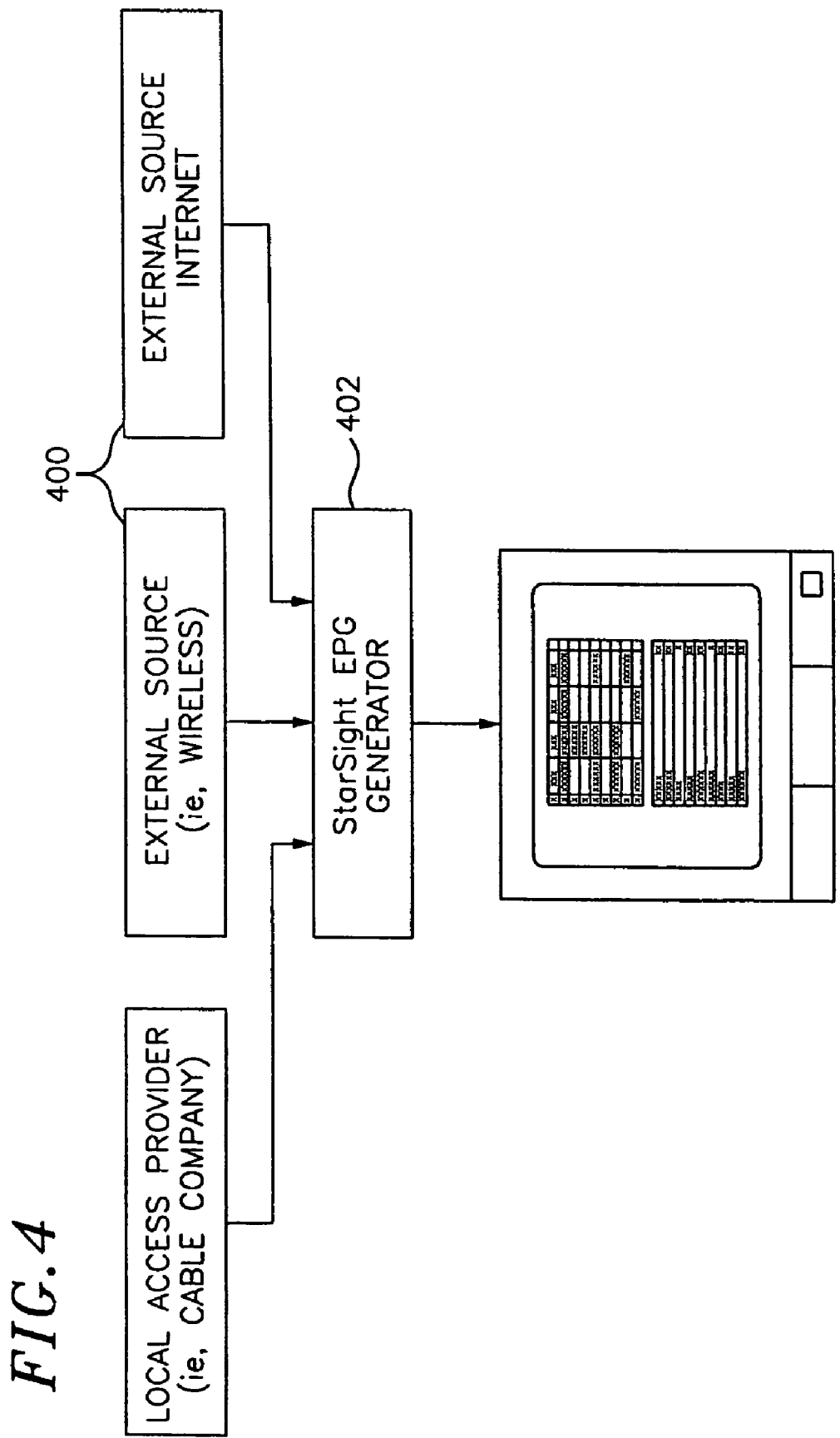
FIG. 4 is a schematic diagram depicting program/event sources for a PCTV utilizing a filter system.

In the example described above with reference to FIG. 2A, the filters were applied to programming provided by the local service provider over a cable. However, as depicted in FIG. 4, the filters may also be applied to programs and events delivered by non-cable sources such as wireless, Internet, and satellite. These non-cable sources 400 supply program guide data to the EPG generator 402 which is stored in a data base. The filters can then be applied to program data stored in the data base to generate a filtered EPG for cable and non-cable programming.

Another use of non-cable supplied information is to use the internet to provide offers for premium cable-supplied subscription services. The subscription is initiated through the internet and premium subscription service is made available to the user.

What is claimed is:

1. A method for managing program listings comprising:

storing available program listings in at least one database, wherein the program listings comprise a plurality of program/event entries, wherein each program/event entry corresponds one-to-one to a specific program included in the program listings;

selecting a first subset of the plurality of program/event entries using a first filter comprising a predetermined list of program/event entries, wherein the first subset is selected by comparing the program/event entries of the available program listings with the predetermined list of program/event entries of the first filter;

generating electronic program guide listings comprising the selected first subset of the plurality of program/event entries; and displaying the generated electronic program guide listings.

2. The method of claim 1 further comprising:

selecting a second subset of the plurality of program/event entries using a second filter comprising a second predetermined list of program/event entries, wherein the second subset is selected by comparing the program/event entries of the available program listings with the second predetermined list of program/event entries of the second filter; and generating the electronic program guide listings comprising the selected first subset and the selected second subset of the plurality of program/event entries.

3. The method of claim 1 further comprising:

selecting a second subset of the plurality of program/event entries using a second filter comprising a second predetermined list of program/event entries, wherein the second subset is selected by comparing the program/event entries of the available program listings with the second predetermined list of program/event entries of the second filter, and wherein the first subset and the second subset both include at least one same program/event entry from the plurality of program/event entries; and generating the electronic program guide listings comprising each same program/event entry included in both the first subset and said second subset.

4. The method of claim 1 further comprising:

prior to selecting the first subset of the plurality of program/event entries, creating the first filter using the predetermined list of program/event entries in the at least one database.

5. The method of claim 1 further comprising storing the program listings and the first filter in a consumer device from a source external to the consumer device.

6. The method of claim 1 wherein the first filter is an editable filter.

7. The method of claim 1 wherein the first filter comprising the predetermined list of program/event entries is received from a third party other than a local service provider or a user.

8. A system for managing program listings comprising:

a memory configured to store:

a database of available program listings comprising a plurality of program/event entries, wherein each program/event entry corresponds one-to-one to a specific program included in the program listings, and a first filter comprising a predetermined list of program/event entries;

a processor configured to:

select a first subset of the plurality of program/event entries using the first filter, wherein the first subset is selected by comparing the program/event entries of the available program listings with the predetermined list of program/event entries of the first filter, generate electronic program guide listings comprising the selected first subset of the plurality of program/event entries; and a display device configured to display the generated electronic program guide listings.

9. The system of claim 8 wherein:

the memory is further configured to store a second filter comprising a second predetermined list of program/event entries; and the processor is further configured to:

select a second subset of the plurality of program/event entries using the second filter by comparing the program/event entries of the available program listings with the second predetermined list of program/event entries of the second filter, and generate the electronic program guide listings comprising the selected first subset and the selected second subset of the plurality of program/event entries.

10. The system of claim 8 wherein:

the memory is further configured to store a second filter comprising a second predetermined list of program/event entries; and the processor is further configured to:

select a second subset of the plurality of program/event entries using the second filter by comparing the program/event entries of the available program listings with the second predetermined list of program/event entries of the second filter, and wherein the first subset and the second subset both include at least one same program/event entry from the plurality of program/event entries, and generate the electronic program guide listings comprising each same program/event entry included in both the first subset and said second subset.

11. The system of claim 8 wherein the processor is further configured to, prior to selecting the first subset of the plurality of program/event entries, create the first filter using the predetermined list of program/event entries in the database.

12. The system of claim 8 further comprising a consumer device configured to store the program listings and the first filter from a source external to the consumer device.

13. The system of claim 8 wherein the first filter is an editable filter.

14. The system of claim 8 wherein the first filter comprising the predetermined list of program/event entries is received from a third party other than a local service provider or a user.

15. A system for managing program listings comprising:

means for storing available program listings in at least one database, wherein the program listings comprise a plurality of program/event entries, wherein each program/event entry corresponds one-to-one to a specific program included in the program listings;

means for selecting a first subset of the plurality of program/event entries using a first filter comprising a predetermined list of program/event entries, wherein the first subset is selected by comparing the program/event entries of the available program listings with the predetermined list of program/event entries of the first filter;

means for generating electronic program guide listings comprising the selected first subset of the plurality of program/event entries; and means for displaying generated electronic program guide listings.

16. The system of claim 15 further comprising:

means for selecting a second subset of the plurality of program/event entries using a second filter comprising a second predetermined list of program/event entries, wherein the second subset is selected by comparing the program/event entries of the available program listings with the second predetermined list of program/event entries of the second filter; and means for generating the electronic program guide listings comprising the selected first subset and the selected second subset of the plurality of program/event entries.

17. The system of claim 15 further comprising:

means for selecting a second subset of the plurality of program/event entries using a second filter comprising a second predetermined list of program/event entries, wherein the second subset is selected by comparing the program/event entries of the available program listings with the second predetermined list of program/event entries of the second filter, and wherein the first subset and the second subset both include at least one same program/event entry from the plurality of program/event entries; and means for generating the electronic program guide listings comprising each same program/event entry included in both the first subset and said second subset.

18. The system of claim 15 further comprising:

prior to the means for selecting the first subset of the plurality of program/event entries, means for creating the first filter using the predetermined list of program/event entries in the at least one database.

19. The system of claim 15 further comprising means for storing the program listings and the first filter in a consumer device from a source external to the consumer device.

20. The system of claim 15 wherein the first filter is an editable filter.

21. The system of claim 15 wherein the first filter comprising the predetermined list of program/event entries is received from a third party other than a local service provider or a user.

* * * * *

UNITED STATES PATENT AND TRADEMARK OFFICE
CERTIFICATE OF CORRECTION

| | | |
|---|---|---|
| PATENT NO. | : 7,543,321 B2 | Page 1 of 1 |
| APPLICATION NO. | : 10/967672 | |
| DATED | : June 2, 2009 | |
| INVENTOR(S) | : James J. Leftwich | |

It is certified that error appears in the above-identified patent and that said Letters Patent is hereby corrected as shown below:

In the Figures:

In Sheet 3 of 6, FIG. 2A, in box under "SERVICE PROVIDER GUIDE LISTINGS" change "THROUGH" to --THOUGH--; and In Sheet 4 of 6, FIG. 2b, in first column under "8:00 PM", change "PROMISE LAND" to --PROMISED LAND--.

In the Specification:

In column 2, line 32, delete "of" after "depicting";

In column 2, line 48, change "StarSight and described" to --StarSight, and as described--;

In column 2, line 53, change "provides" to --provided--;

In column 3, line 67, change "history/preferences.)" to --history/preferences).--;

In column 4, line 4, change "history/preferences.)" to --history/preferences).--; and In column 4, line 8, change "programs/events.)" to --programs/events).--.

Signed and Sealed this

Twenty-second Day of September, 2009

David J. Kappos
*Director of the United States Patent and Trademark Office*